United States Patent
Griessnig

(10) Patent No.: US 7,990,096 B2
(45) Date of Patent: Aug. 2, 2011

(54) MOBILE OPERATING DEVICE AND METHOD FOR USING SAID DEVICE

(75) Inventor: Gerhard Griessnig, Graz (AT)

(73) Assignee: Siemens Aktiengesellschaft, Munich (DE)

( * ) Notice: Subject to any disclaimer, the term of this patent is extended or adjusted under 35 U.S.C. 154(b) by 555 days.

(21) Appl. No.: 12/221,424

(22) Filed: Jul. 31, 2008

(65) Prior Publication Data

US 2009/0079579 A1    Mar. 26, 2009

(30) Foreign Application Priority Data

Aug. 2, 2007  (EP) .................................... 07015226

(51) Int. Cl.
*H02J 7/00*      (2006.01)
*G05B 1/00*      (2006.01)
*G06F 15/50*     (2006.01)

(52) U.S. Cl. .................... 318/587; 318/16; 318/568.12; 318/568.16; 701/23; 701/28; 180/168; 901/1; 901/46

(58) Field of Classification Search .................. 318/16, 318/587, 568.12, 568.16; 701/23, 28; 180/168; 901/1, 46
See application file for complete search history.

(56) References Cited

U.S. PATENT DOCUMENTS

| | | | | |
|---|---|---|---|---|
| 4,780,817 A * | 10/1988 | Lofgren | ............. | 701/23 |
| 5,081,585 A * | 1/1992 | Kurami et al. | ............. | 701/28 |
| 5,179,329 A * | 1/1993 | Nishikawa et al. | ............ | 318/587 |
| 5,220,263 A * | 6/1993 | Onishi et al. | ............. | 318/587 |
| 5,400,244 A * | 3/1995 | Watanabe et al. | ............. | 701/28 |
| 5,488,277 A * | 1/1996 | Nishikawa et al. | ............ | 318/587 |
| 5,568,030 A * | 10/1996 | Nishikawa et al. | ............ | 318/587 |
| 5,819,008 A * | 10/1998 | Asama et al. | ............. | 700/255 |
| 6,049,745 A * | 4/2000 | Douglas et al. | ............. | 701/23 |
| 6,751,535 B2 * | 6/2004 | Mori | ............. | 701/23 |
| 2001/0035729 A1 | 11/2001 | Graiger et al. | | |
| 2007/0205861 A1 * | 9/2007 | Nair et al. | ............. | 340/5.61 |
| 2007/0297890 A1 | 12/2007 | Sjoberg et al. | | |

FOREIGN PATENT DOCUMENTS

| WO | WO 2006/000571 A1 | 1/2006 |
|---|---|---|
| WO | WO 2006/105567 A2 | 10/2006 |

* cited by examiner

*Primary Examiner* — Paul Ip

(57) ABSTRACT

There is described a method to operate a mobile operating device and a mobile operating device, with which machines within of effective ranges which are spanned by RFID transponders can be operated wirelessly. A safety module is provided in the operating device, with which both measured values assigned to the RFID transponders and also reference values of two reference transponders simulated in the operating device are checked in order to ensure the correct measurement and further processing in this way.

17 Claims, 3 Drawing Sheets

FIG 3

| Designation | Data type | Measured value | F module expectations |
|---|---|---|---|
| TAG ID | 2 UBYTE | 0x0000 | 0x0000 |
| Distance | 1 UBYTE | 0x00 | 0x00 |
| Distance + 3m | 1 UBYTE | 0x1E | 0x1E |

FIG 4

| Designation | Data type | Measured value | F module expectations |
|---|---|---|---|
| TAG ID | 2 UBYTE | 0xFFFF | 0xFFFF |
| Distance | 1 UBYTE | 0x00 | 0xFF |
| Distance + 3m | 1 UBYTE | 0x1E | 0xE1 |

MOBILE OPERATING DEVICE AND METHOD FOR USING SAID DEVICE

CROSS REFERENCE TO RELATED APPLICATIONS

This application claims priority of European Patent Office application No. 07015226.9 EP filed Aug. 2, 2007, which is incorporated by reference herein in its entirety.

FIELD OF INVENTION

The invention relates to a method for using a mobile operating device and a mobile operating device with which at least one machine can be operated within a plant in a safety-relevant manner

BACKGROUND OF INVENTION

It is not permitted to carry out hazardous actions at machines/plants in the safety-relevant environment from any location. Previously it was only possible to operate these systems at stationary points or with cabled devices. These limiting factors are however overcome by wireless transmission technologies. To comply with the requirements of safety technology ranges must be technically defined and there must be a unique assignment to these ranges. The practice of defining corresponding effective ranges is already known, within which a machine can be operated wirelessly by means of an operating device. In such cases the effective ranges are delimited by one or more RFID transponder. High demands as regards safety are imposed on the use of such operating devices in conjunction with the function of the effective ranges. To save money and development costs, such devices are developed where possible according to a standard process using standard components available. However these components are still to be included in the safety function.

SUMMARY OF INVENTION

An underlying object of the invention is thus to propose a method of the type specified above, which ensures that the radio signals received by the operating device are processed correctly in order to make their use in the safety-relevant area possible.

Another object of the is to propose an operating device of the type described above with which the correct further processing of the received radio signals is ensured, to make it possible to use said operating device in the safety-relevant environment.

The aim here is to check the entire transmission chain of hardware and software components for determining transponder data.

The first object is achieved by a method with the features as claimed in a first independent claim. The further object is achieved by a mobile operating device with the features as claimed in a further independent claim.

Advantageous developments of the invention are to be taken from the subclaims.

For the method the mobile operating device is provided. The mobile operating device has a read device for receiving the radio signals sent out by RFID transponders in an plant and an evaluation unit for evaluation of these radio signals. At least one machine can be operated within a plant in a safety-relevant manner, with operation being undertaken within an effective range assigned to the machine which is delimited by one or more RFID transponders.

An especially advantageous development of the inventive method is produced by the reference transponders being simulated by upwards modulation of corresponding reference transponder signals in the read device.

It is also advantageous for a first and a second of the reference transponders to be assigned an identification number in each case and for the entire range of identification numbers of the RFID transponders located in the plant to be covered by these two identification numbers.

If the reference transponder signals of the reference transponder modulated upwards in the read device are delayed by means connected downstream from the read device, through which an additional distance is simulated, the correct distance measurement and evaluation of the correct distance measurement can be checked in this way. The known delay namely results in an additional defined distance.

If the reference transponder signals of the first reference transponder and those of the second reference transponder are modulated upwards alternately in the read device, it is thus possible to cater for any blocking of a bit which may occur.

It is also of particular advantage if for expected values to be present in the safety module for the first reference transponder in respect of the identification number and the distances with and without delay of the reference transponder signals, which is compared with data determined via the transmission chain as regards the identification number and the distances with and without delay. In this way it is possible to check the entire transmission chain of hardware and software components for determination of the transponder data.

Finally it also proves especially advantageous if for one of the two expected values for the distance with and without delay to be determined mathematically for the second reference transponder from one of the two measured distance values and the other of the two expected values respectively for the distance with and without delay. With these method steps it is possible to cater for a "Stuck AT error" in a simple manner for example.

BRIEF DESCRIPTION OF THE DRAWINGS

An exemplary embodiment of the invention is explained in more detail below with reference to a drawing. The figures show.

DETAILED DESCRIPTION OF INVENTION

Figure 1:
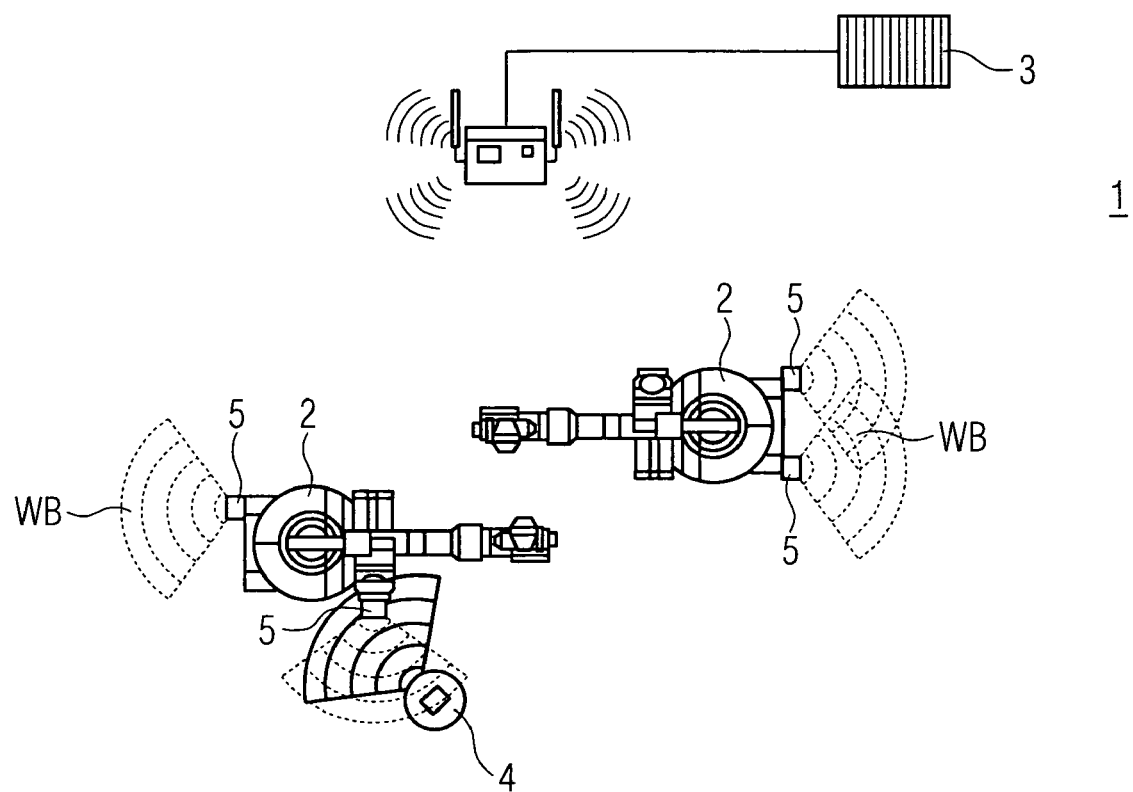
FIG. 1 a system with a mobile, wirelessly communicating operating device for operation of machines in a safety-relevant environment, FIG. 2 an inventive operating device, FIG. 3 a table with the reference values of a first reference transponder and FIG. 4 a table with the reference values of a second reference transponder.
Figure 2:
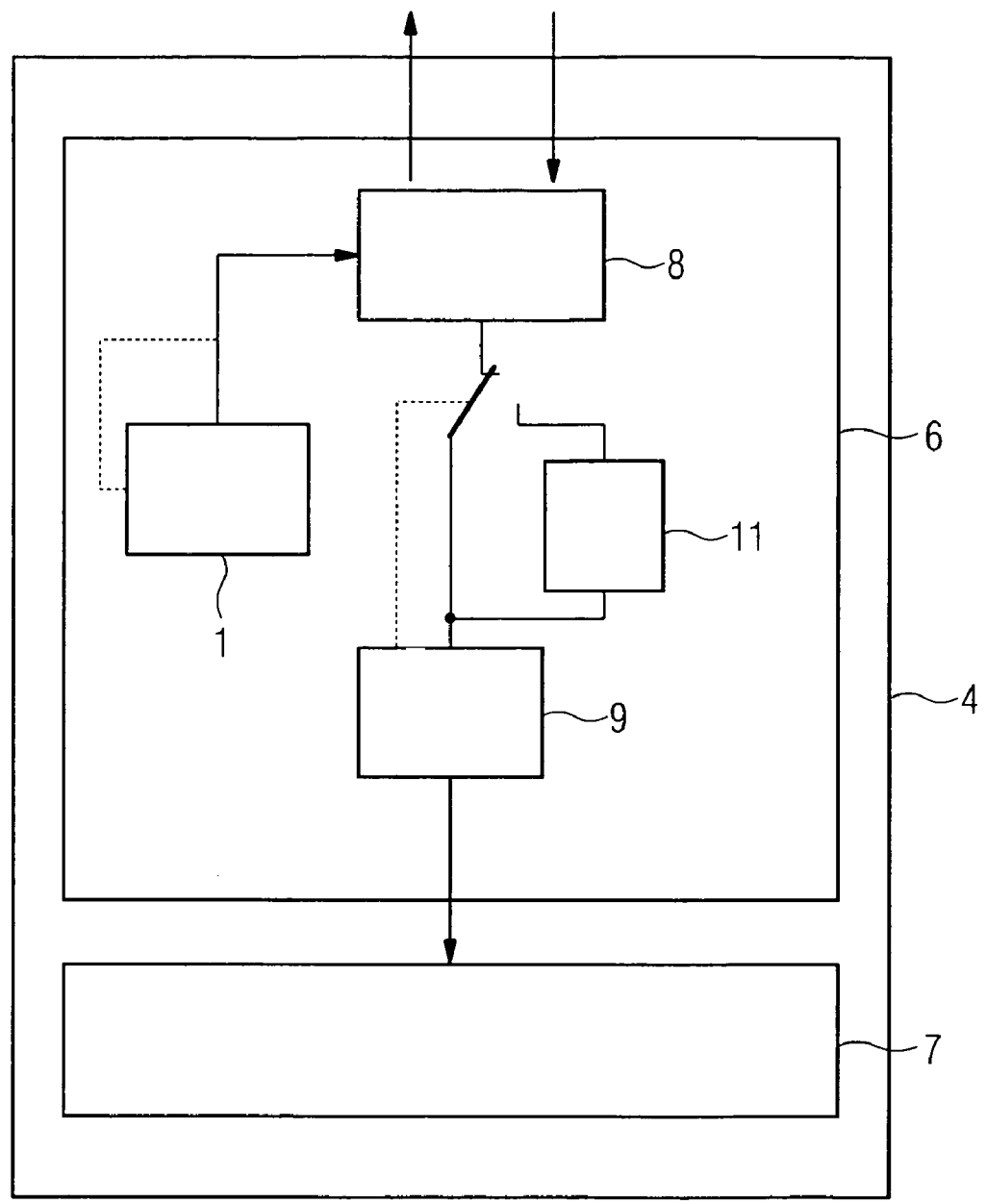

FIG. 1 shows a system for operating machines 2 or plants. System 1 features a controller 3 and a mobile operating device 4, which has means for wireless communication, here specifically an RFID (Radio Frequency Identification) radio connection with the controller 3.

Command Signals via WLAN

The operation of the machine 2 is only permitted after logging on in specific effective ranges which are spanned by specific RFID transponders 5. Only after log on in these effective ranges can hazardous actions, e.g. operating machines, be undertaken.

To comply with safety systems requirements ranges must already be defined and unique assignments must be made to these ranges. Accordingly the effective ranges WB which are spanned by one or more RFID transponders are defined for the system 1. In this case the spatial definition of the effective ranges WB is determined by the antenna characteristic of the RFID transponder 5 as well as by the projectable maximum distance of the mobile operating device 4 to the relevant RFID transponder 5.

The mobile safety-relevant operating device 4 features non safety-relevant hardware and software components in an effective range module 6 which is supported by a safety module 7 with safety measures. This safety module 7 is used to check and ensure that the evaluation of the radio signals received in the effective range WB is correct. The effective range module 6 has a read device 8 for receiving radio signals as well as an evaluation unit 9 for evaluation of the radio signals. Coupled to the read device 8 are one or more reference transponders R, R1, R2, that are simulated by upwards modulation of the corresponding reference transponder signals in the read device 8. As well as the direct coupling of the read device 8 to the evaluation unit 9 an intermediate connection of a delay line 11 between these two components is possible.

Essentially two parameters are determined in the non-safety-relevant affective range module 6. The first parameter is the evaluation of the identification number ID of the relevant RFID transponder 5 and the second parameter is the distance to the RFID transponder 5 measured during receiving of the identification number ID. These two parameters must be available to the safety module 7.

To be able to trust the parameters determined, reference measurements with reference transponders R, R1, R2 are conducted independently of the ongoing measurements to the RFID transponders 5. With these reference measurements the hardware and software components of the effective range module 6 that are responsible for determining the parameters needed, as well as the read device 8—evaluation unit 9—safety module 7 transmission chain are checked. The safety module 7 has a definite time and value-linked expected relationship to the received reference values. If this expected relationship is violated, i.e. if the expected values do not conform to the timings or values required, the effective range module 6 is no longer trusted and the safe state is assumed.

To this end a simulated reference transponder R, R1, R2 is injected into the read device 8 at defined points in time independently of the ongoing measurements to the RFID transponders 5. Since the injected reference transponder signal is always stronger than a normal transponder signal, this ensures that a reference measurement is undertaken at specific time intervals. The identification number ID1 or ID2 of a first or second reference transponder R1, R2 and the corresponding distance to these reference transponders are subsequently determined in the evaluation unit 9 with the injection of the reference signal.

Since the reference transponder R, R1, R2 is located in the effective range module 6 itself, the measured distance to the reference transponder must correspond to 0 m. However, in order to detect an error in which the distance measurement always delivers the reference distance value 0 m, the delay 11 is additionally provided, which increases the reference distance value by 3 m. Each measurement is undertaken in the following two steps, regardless of whether a reference transponder R, R1, R2 or a normal RFID transponder 5 is involved.

First Step:
Measurement of the distance without delay line 11.
Second Step:
Measurement of the distance with delay line 11.

This means that the result of each measurement, in addition to the identification number ID, delivers a first distance value and a distance value increased by three meters. With the delay line 11 the range of values can be additionally increased and additional information produced about the measurement itself.

At least two reference transponders R1, R2 should have been provided, of which the signals are injected alternately at specific intervals x into the read device 8. Their identification numbers ID1, ID2 are selected in accordance with FIGS. 3 and 4 with 0x0000 and 0xFFFF so that they cover the entire area of all RFID transponders 5 in the plant and allow the blocking of a bit to be detected. To cater for the range of values of the distance measurement, the measured distance is additionally subtracted from the maximum range of values in a reference measurement—as shown in the table depicted in FIG. 4 for the reference transponder R2. In the table depicted in FIG. 3 the measured resistance values of the reference transponder R1 as well as the associated expected values are also mapped.

The inventive mobile operating device 4 is designed so that all measurement data of the effective range module 6 can be forwarded without intermediate storage to the safety module 7, i.e. the measured values for the reference transponders R, R1, R2 take the same path as the measured values of the RFID transponder 5 of the plant.

The invention claimed is:

1. A method for using a mobile operating device to operate at least one machine in a safety-relevant manner in a plant, comprising:
   providing the mobile operating device having a read device for receiving radio signals and an evaluation unit for evaluation of the radio signals;
   operating the machine within an effective range assigned to the machine, which is delimited by one or more RFID transponders;
   receiving the radio signals of an RFID transponder located in the receive zone of the read device by the read device;
   receiving the radio signals by the evaluation unit;
   determining an identification number of this RFID transponder by the evaluation unit based upon the received radio signals;
   determining a distance of the RFID transponder to the operating by the evaluation unit based upon the received radio signals;
   forwarding the data to a safety module in the operating device by the evaluation unit;
   receiving from at least one reference transponder its identification number and distance at predetermined intervals by the safety module via the transmission chain read device, evaluation unit and safety module; and
   checking as to whether the data of the reference transponder as regards the identification number and the distance as well as the predetermined intervals, is being received as expected by the safety module.

2. The method as claimed in claim 1, wherein the reference transponders are simulated by upwards modulation of corresponding reference transponder signals in the read device.

3. The method as claimed in claim 2, wherein a first and a second of the reference transponders is assigned an identification number respectively and the entire range of identification numbers of the RFID transponders located in the plant is covered by these two identification numbers.

4. The method as claimed in claim 3, wherein the reference transponder signals modulated up in the read device are delayed downstream from the read device by which an additional distance is simulated.

5. The method as claimed in claim 2, wherein the reference transponder signals of a first reference transponder and of a second reference transponder are modulated up alternately in the read device.

6. The method as claimed in claim 1, wherein a first and a second of the reference transponders is assigned an identification number respectively and the entire range of identification numbers of the RFID transponders located in the plant is covered by these two identification numbers.

7. The method as claimed in claim 6, wherein the reference transponder signals modulated up in the read device are delayed downstream from the read device by which an additional distance is simulated.

8. The method as claimed in claim 6, wherein the reference transponder signals of the first reference transponder and of the second reference transponder are modulated up alternately in the read device.

9. The method as claimed in claim 1, wherein the reference transponder signals of the first reference transponder and of the second reference transponder are modulated up alternately in the read device.

10. The method as claimed in claim 1, wherein there are expected values in the safety module for a first and second reference transponder in respect of the identification number and the distances with and without delay of reference transponder signals, which are compared with data determined via the transmission chain as regards the identification number and the distances with and without delay.

11. The method as claimed in claim 6, wherein for the second reference transponder the two expected values for the distance with and without delay are formed mathematically from the maximum range of values and the measured distance value respectively.

12. A mobile operating device with which at least one machine in a plant can be operated in a safety-relevant manner, comprising:
a read device for receiving the radio signals sent out by RFID transponders in the plant;
an effective range assigned to the machine which is delimited by one or more RFID transponders, wherein an operation is provided within the effective range; and
an evaluation unit for evaluation of these radio signals and for determining an identification number and the distance of the respective RFID transponder to the operating device from the radio signals for this received by the read device, wherein the evaluation unit has a safety module connected downstream from it which is used for checking the correct function of the operating device as regards transmission and evaluation of the received radio signals in the read device—evaluation unit—safety module transmission chain, and wherein a check is provided in the safety module of reference values of at least one reference transponder simulated in the operating device, for which purpose a comparison of these reference values with corresponding expected values is provided in the safety module after the reference values have passed through the read device—evaluation unit—safety module transmission chain.

13. A mobile operating device as claimed in claim 12, wherein the comparison in the safety module includes a time and value-linked expected relationship to the reference values.

14. The mobile operating device as claimed in claim 13, wherein a reference identification number and a reference distance value of the respective reference transponder serve as reference values.

15. The mobile operating device as claimed in claim 12, wherein a reference identification number and a reference distance value of the respective reference transponder serve as reference values.

16. The mobile operating device as claimed in claim 12, wherein a correspondingly enlarged reference distance value is produced based on a delay.

17. The mobile operating device as claimed in claim 16, wherein the delay is based upon a delay line.

* * * * *